May 10, 1960
W. J. PARRISH
2,935,926
REGISTER FOR HEATING AND AIR CONDITIONING SYSTEMS
Filed Aug. 27, 1956
3 Sheets-Sheet 2
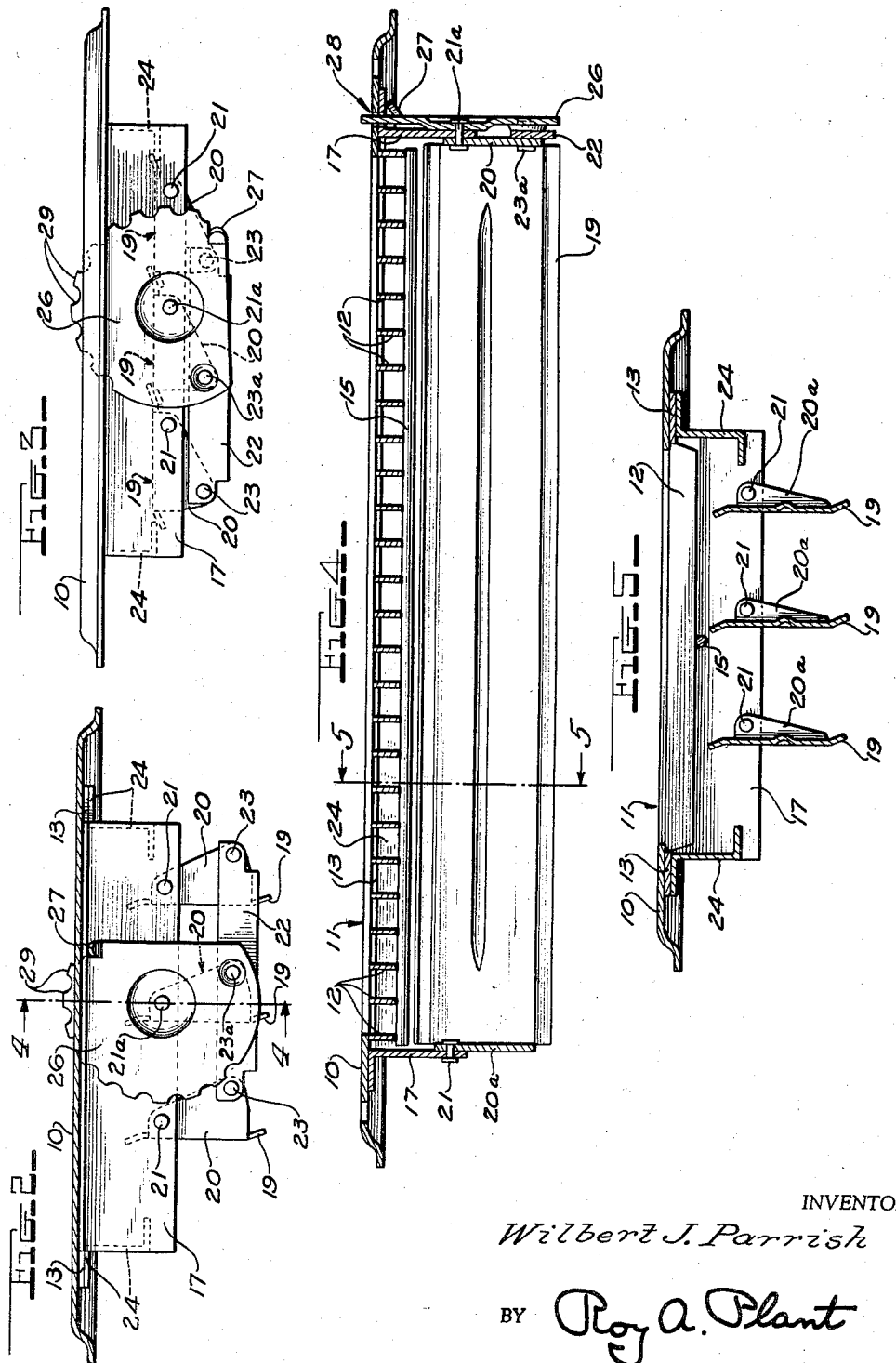
INVENTOR
Wilbert J. Parrish
BY Roy A. Plant
ATTORNEY

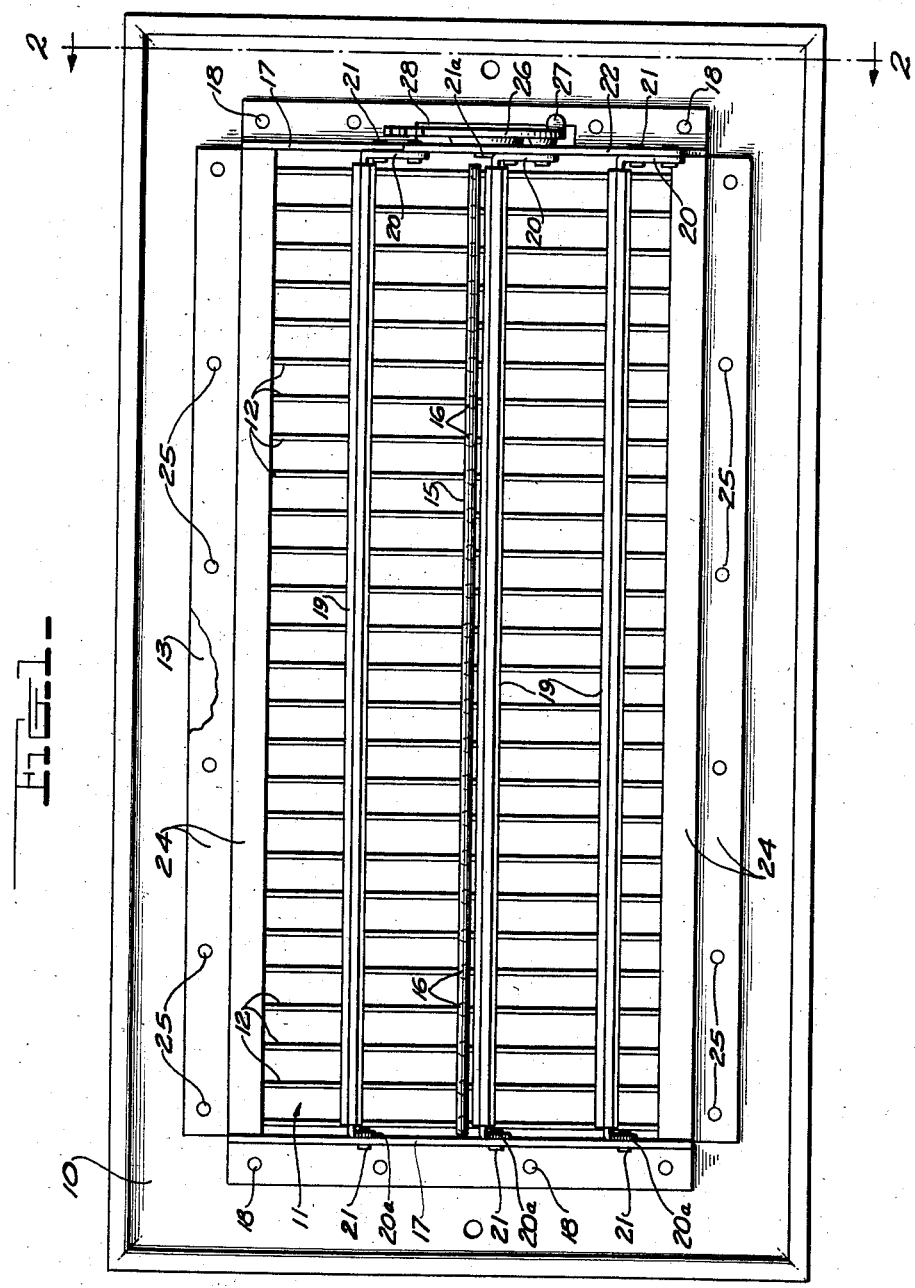

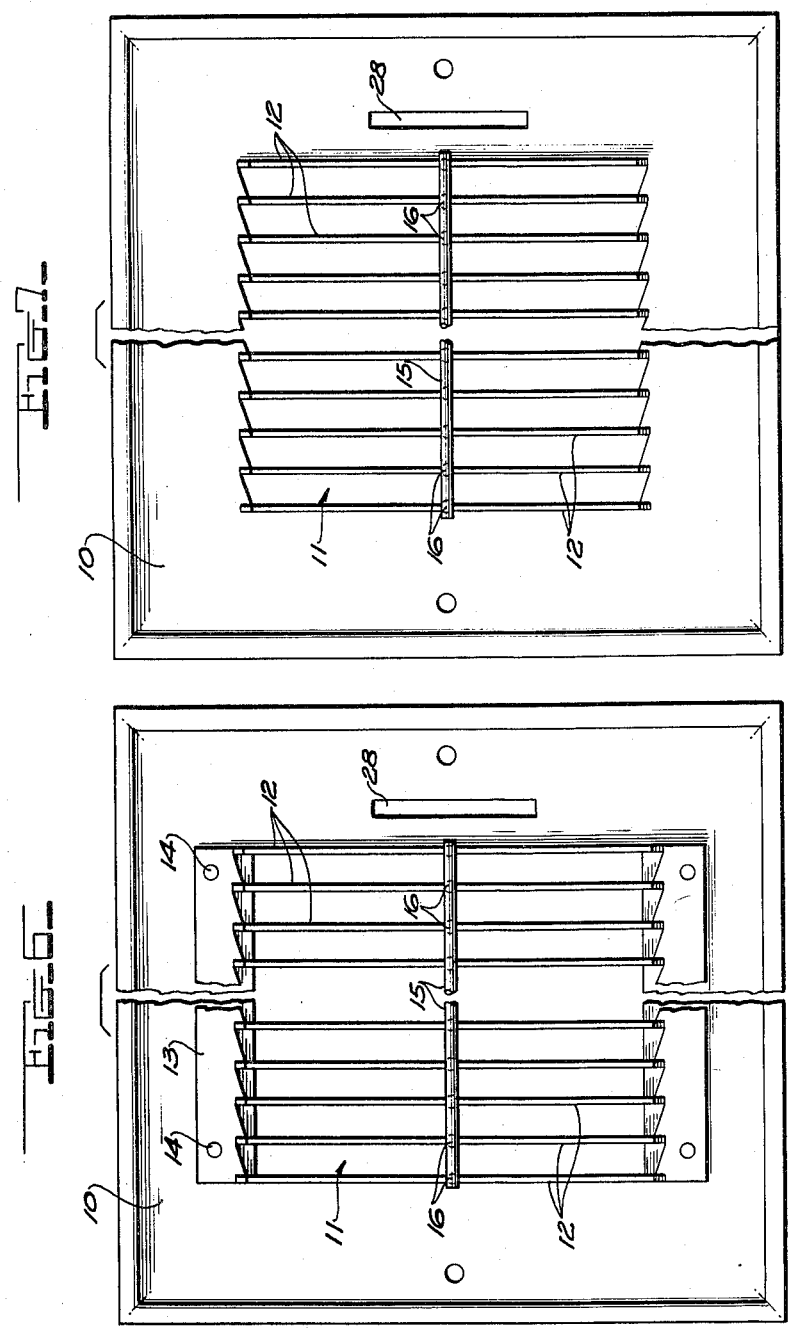

United States Patent Office 2,935,926
Patented May 10, 1960

2,935,926

REGISTER FOR HEATING AND AIR CONDITIONING SYSTEMS

Wilbert J. Parrish, Battle Creek, Mich., assignor to United States Register Company, Battle Creek, Mich., a corporation of Michigan Application August 27, 1956, Serial No. 606,490

5 Claims. (Cl. 98—110)

This invention relates broadly to registers for air duct systems, and in its more specific form to a new and improved dampered register for incorporation in a duct type heating or air conditioning system. The invention is intended primarily for use in the floor of a house trailer in which the heating ducts are of shallow form and the register must be strong, but it may, of course, be used in other environments if desired.

The hot air ducts in house trailers, or so-called trailer coaches, are of necessity very shallow due to the thinness of the floor panel and the need of insulation within the floor panel and under the hot air ducts. Nevertheless, the only dampered registers available for these trailer coaches have been so thick that they practically reached the bottom of the ducts and acted more like a stopper for the duct than a dampered register. Those registers also were subject to damage when walked on, and frequently, under forced air flow, would vibrate or whistle. It was a recognition of these problems and difficulties, and the lack of a thoroughly satisfactory solution to same which led to the conception and development of the present invention.

Accordingly among the objects of the present invention is the provision of a novel louver type register which may be constructed with an unusually small over-all thickness and will thus be better adapted for use in a hot or cold air system having shallow ducts.

Another object of the invention is to provide an extremely simple sheet metal construction register which may be expeditiously manufactured and profitably marketed at a reasonable price.

A further object is to provide an unusually simple and inexpensive construction for opening and closing the louvers.

A further object is to provide a novel grille for the register face plates, in which parallel grille bars are effectively tied together to prevent relative springing or bending, and if said grille bars be thin enough to vibrate and hum or whistle, to prevent such vibration and noises.

A further object is to provide one form of construction in which the tied-together grille bars are integral with a second plate welded to the face plate.

Yet a further object is to provide a second and more simple form of construction in which the tied-together grille bars are integral with the face plate of the register.

Still further objects and advantages of the present invention will appear as the description proceeds.

To the accomplishment of the foregoing and related ends, the invention, then, consists of the register means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

Figure 1 is a bottom plan view of the register with the louvers open.

Figure 2 is a transverse sectional view on line 2—2 of Figure 1, looking in the direction of the arrows, showing the louver operating means in louver-open positon.

Figure 3 is an end elevation, the louver operating means being shown in louver-closed position.

Figure 4 is a longitudinal sectional view on line 4—4 of Figure 2, looking in the direction of the arrows.

Figure 5 is a transverse sectional view on line 5—5 of Figure 4, looking in the direction of the arrows.

Figure 6 is a bottom view of the face plate with a second plate welded thereto, the grille bars being integral with said second plate.

Figure 7 is a similar view showing the grille bars integral with the face plate.

The construction shown in the drawings will be rather specifically described but attention is invited to the possibility of making variations within the obvious spirit and scope of the invention as shown in the drawings and hereinafter set forth in detail.

The top or face plate 10 is preferably of rectangular form and is constructed with an opening 11 spanned by transverse grille bars 12 which are disposed in substantially parallel planes. The grille bars 12 may be integral with a second plate 13 spot-welded at 14, Figure 6, to the top or face plate 10, Figures 1 to 6 inclusive, or may be integral with said top or face plate 10 as shown in Figure 7. In either instance, the lower edges of the grille bars are in a plane below the plate 10, and said edges are connected by tie means which effectively holds them against relative lateral bending; and if the grille bars be sufficiently thin to vibrate and produce undesirable noises, such vibration and noises are also prevented by said tie means. This tie means is preferably in the form of a single small diameter rod 15 extending across the lower edges of all of the grille bars 12, preferably centrally between their ends, said rod and edges being spot-welded together as indicated at 16 in Figures 1, 6 and 7.

Two transverse louver mounting angle bars 17 are spot-welded at 18, Figure 1, to the lower side of the top or face plate 10, at the ends of the opening 11, the major portions of said bars 17 being perpendicular to the plane of face plate 10. Louvers 19 extend longitudinally of the top or face plate 10, under the grille bars 12 so as to preferably just clear same under full damper operation, and have their ends disposed in abutting relation with the agle bars 17. At one end, each louver 19 has a wide lateral flange 20, and at its other end has a flange 20a which may be narrower. The upper ends of the flanges 20 and 20a are connected by pivots with the lower portions of the angle bars 17. All of these pivots, except one, are denoted at 21, said one pivot, however, being given the reference character 21a for later reference. This pivot 21a is the centermost at one end of the register in the present disclosure.

A transverse link 22 is disposed below the angle bar 17 which carries the pivot 21a, and this link 22 is connected by a different series of pivots with the lower ends of the louver flanges 20. All of these latter pivots, except one, are denoted at 23, this one pivot, however, being given the reference character 23a. This one pivot 23a is the centermost in the present disclosure and is specifically identified for later reference.

The link 22 and pivots 23, 23a connect the louvers 19 for closing in unison and for opening in unison; and two longitudinal Z-bars 24, Figures 1 to 5 inclusive, are provided in position to be struck of the outermost louvers when the latter are fully closed, to tightly shut off the passage of air through the register. These Z-bars 24 are spot-welded at 25, Figure 1, to the plate 13 when this plate is employed, or direct to the top or face plate 10 when said plate 13 is not used.

A louver-operating wheel 26 is mounted on the pivot 21a, as best seen in Figures 2, 3 and 4, and said wheel is pivotally connected to the link 22 by the pivot 23a. Thus, turning of the wheel 26 will operate the link 22 to open or close the louvers 19 as required. The Z-bars 24 limit the closing of the louvers, and the wheel 26 has a lateral stop 27 adapted to engage the under face of face plate 10, as shown in Figures 1 and 2, to limit louver opening at the fully open position.

The wheel 26 extends through a slot 28 in face plate 10, for operation by a person's hand or foot, and said wheel has teeth 29 on its edge for antislipping purposes.

From the foregoing, it will be seen that a novel and advantageous register construction has been disclosed for attaining the desired ends. Attention, however, is again invited to the possibility of making variations within the spirit and scope of the invention as set forth, recognizing, of course, that directional terms such as "top," "lower," "upper," et cetera, are used to facilitate explanation of the invention and are not limiting on the invention.

Other modes of applying the principle of my invention may be employed instead of those explained, change being made as regards the register constructions herein disclosed, provided the means stated by any of the following claims or the equivalent of such stated means be employed.

I therefore particularly point out and distinctly claim as my invention:

1. A floor register comprising a sheet metal top plate having an opening and a relatively shallow grille in the form of fixed inwardly extending, relatively narrow, sheet metal grille bars spanning said opening, means fixedly joining said grille bars to said top plate at opposite sides of said opening, two transverse louver-mounting bars secured to the under face of said top plate and projecting downwardly therefrom at the ends of said opening, a multiplicity of louvers extending longitudinally under said grille so as to just clear same, and having their ends disposed in abutting relation with said louver-mounting bars, upper pivots for said louvers near but spaced from the upper edges of said louvers to form an overhang on the latter for overlapping purposes while said pivots at the same time connect the ends of said louvers with said louver-mounting bars, a link under one of said louver-mounting bars, lower pivots on said louvers connecting said link with the adjacent ends of said louvers and disposed near the lower edges of the latter but spaced outward from the side of each of said louvers further than said upper pivots, said link and lower pivots connecting said louvers for movement in unison to open position and to closed position, two longitudinal Z-bars secured to the under side of said top plate at the sides of the aforesaid opening, said longitudinal Z-bars each having a lower flange facing the other with said Z-bars extending between the ends of said transverse bars in positions to abut the outermost of said louvers when the latter are closed, and a louver-operating wheel at the outer side of said one of said louver-mounting bars, said wheel being rotatably mounted in fixed position on one of said louver upper pivots and being pivotally connected at a fixed point near its outer edge to said link by means of one of said louver lower pivots, said top plate having a slot through which said wheel projects accessibly for operation.

2. A floor register comprising a sheet metal top plate having an opening and a relatively shallow grille having inwardly extending, relatively narrow, sheet metal grille bars spanning said opening, means fixedly joining said grille bars to said top plate at opposite sides of said opening, a multiplicity of louvers under and operably just clearing the under face of said grille, mounting means for supporting said louvers, said mounting means including a mounting bar fixed to said top plate at each end of said louvers and carrying upper pivots connecting the ends of said louvers with each of said mounting bars, said pivots being disposed near but spaced from the upper edges of the ends of said louvers to form an overhang on the latter for overlapping when closed; a link under one of said mounting bars, and lower pivots near the lower edges of said louvers at the same end thereof, said pivots connecting said link with said louvers, said lower pivots also being spaced outward from the side of each of said louvers further than said upper pivots to facilitate closing said louvers; and a louver-operating wheel at the outer side of one of said mounting bars, said wheel being rotatably mounted in fixed position on one of said louver upper pivots and being pivotally connected at a fixed point near its outer edge to said link by means of one of said louver lower pivots, said top plate having a slot through which said wheel projects accessibly for operation at the top of said top plate.

3. A structure as specified in claim 2, in which said grille further comprises fixed location parallel grille bars joined together at their ends and disposed in planes substantially perpendicular to said top plate, said grille bars also projecting downwardly below said top plate, and tie means extending across the lower edges of said grille bars to join them together, said tie means being disposed between the ends of said grille bars and welded to said lower edges of said grille bars but otherwise free and unsupported.

4. A register face plate having a substantially central front opening therethrough and a multiplicity of separate, elongated and parallel sheet metal grille bars spaced apart full length and spanning said opening, means supporting said parallel grille bars solely at their ends on said face plate, said grille bars being substantially perpendicular to the plane of the front of said face plate and having inner edges freely spaced from each other and disposed in a plane spaced inwardly from the plane of the inner side of said face plate, and narrow tie means extending across said spaced apart inner edges of said grille bars and welded thereto to stabilize same with said tie means being otherwise free and unsupported, said tie means being disposed between and spaced from the ends of said end supported separate grille bars and having substantially no directional effect on fluid flow between said grille bars, said grille bars spanning said opening being an integral portion of a second plate welded to said face plate.

5. A floor register comprising a sheet metal top plate having an opening and a relatively shallow grille in the form of fixed inwardly extending, relatively narrow, sheet metal grille bars spanning said opening, means fixedly joining said grille bars to said top plate at opposite sides of said opening, two transverse louver-mounting bars secured to the under face of said top plate and projecting downwardly therefrom at the ends of said opening, a multiplicity of louvers extending longitudinally under said grille so as to just clear same, and having their ends disposed in abutting relation with said louver-mounting bars, upper pivots near, but spaced from the upper edges of said louvers to form an overhang on the latter for overlapping purposes while said pivots at the same time connect the ends of said louvers with said louver-mounting bars, a link under one of said louver-mounting bars, lower pivots on said louvers connecting said link with the adjacent ends of said louvers and disposed near the lower edges of the latter, but spaced outward from the side of each of said louvers further than said upper pivots, said link and lower pivots connecting said louvers for movement in unison to open position and to closed position, two longitudinal Z-bars secured to the under side of said top plate at the sides of the aforesaid opening, said longitudinal Z-bars each having a lower flange facing the other with said Z-bars extending between the ends of said transverse bars in positions to abut the outermost of said louvers when the latter are closed, and a louver-operating wheel at the outer side of said one of said louver-mounting bars, said wheel being rotatably mounted on one of said louver upper pivots and being pivotally connected near its outer edge to said link by means of one of said louver lower pivots, said top plate having a slot through which said wheel projects accessibly for operation, said grille comprising fixed location parallel grille bars joined together at their ends and disposed in vertical planes, said grille bars also projecting downwardly below said top plate, means anchoring said grille bars at their ends to said top plate, and tie means extending across the lower edges of said grille bars and disposed between the ends of said grille bars, said tie means being welded to said lower edges of said grille bars, but otherwise being free and unsupported.

References Cited in the file of this patent

UNITED STATES PATENTS

| | | |
|---|---|---|
| 680,657 | Hart | Aug. 13, 1901 |
| 748,669 | Valentine | Jan. 5, 1904 |
| 936,440 | Fox | Oct. 12, 1909 |
| 1,969,437 | Truax | Aug. 7, 1934 |
| 2,209,384 | Brown | July 30, 1940 |
| 2,285,984 | Kietzmann | June 9, 1942 |
| 2,492,909 | Warp | Dec. 27, 1949 |
| 2,500,330 | Stover | Mar. 14, 1950 |
| 2,511,490 | Bauer | June 13, 1950 |
| 2,712,281 | Riebel | July 5, 1955 |